US012596010B2

(12) United States Patent
Inukai et al.

(10) Patent No.: US 12,596,010 B2
(45) Date of Patent: Apr. 7, 2026

(54) DISPLAY DEVICE, DISPLAY METHOD, AND STORAGE MEDIUM

(71) Applicant: Panasonic Automotive Systems Co., Ltd., Kanagawa (JP)

(72) Inventors: Fumihito Inukai, Kyoto (JP); Akira Tanaka, Osaka (JP); Toshiya Mori, Osaka (JP); Makoto Funabiki, Osaka (JP); Takuma Shimura, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 62 days.

(21) Appl. No.: 18/639,471

(22) Filed: Apr. 18, 2024

(65) Prior Publication Data

US 2024/0361143 A1      Oct. 31, 2024

(30) Foreign Application Priority Data

Apr. 28, 2023     (JP) ................................. 2023-075180

(51) Int. Cl.
*G01C 21/36*          (2006.01)
(52) U.S. Cl.
CPC .................................. *G01C 21/365* (2013.01)
(58) Field of Classification Search
CPC .................................................. G01C 21/365
See application file for complete search history.

(56) References Cited

U.S. PATENT DOCUMENTS

| | | | | |
|---|---|---|---|---|
| 2003/0062827 A1* | 4/2003 | Nagai | .................. | B60K 35/654 |
| | | | | 313/504 |
| 2009/0073263 A1* | 3/2009 | Harada | .................. | G06T 3/047 |
| | | | | 348/148 |
| 2019/0392740 A1* | 12/2019 | Funabiki | ................ | B60K 35/10 |
| 2020/0064629 A1 | 2/2020 | Yamashita et al. | | |
| 2020/0312146 A1* | 10/2020 | Tanaka | .................. | B60K 37/00 |

FOREIGN PATENT DOCUMENTS

| | | |
|---|---|---|
| JP | 2018-189590 A | 11/2018 |
| JP | 6695049 B2 | 5/2020 |
| JP | 2020-159953 A | 10/2020 |

* cited by examiner

*Primary Examiner* — Anne Marie Antonucci
*Assistant Examiner* — Luis G Del Valle
(74) *Attorney, Agent, or Firm* — GREENBLUM & BERNSTEIN, P.L.C.

(57) ABSTRACT

A display device includes: a controller that determines a form in which to display a display object indicating a guide image based on a route (scheduled route) a vehicle is scheduled to drive on; and a display that projects light that forms the display object in the form determined by the controller onto a display medium in the vehicle that reflects the light toward a user in the vehicle, making the display object displayed beyond the display medium visible to the user as a virtual image. When a condition related to driving of the vehicle is satisfied, the controller determines the form so as to give the display object a shape corresponding to a view of the virtual image from an angle of depression greater than an angle of depression corresponding to a view of the virtual image from a viewpoint of the user.

20 Claims, 11 Drawing Sheets

Viewpoint

A

Horizontal direction ← — — — — — — — — — — — — — — —  View from overhead perspective

B

Viewpoint a

Horizontal direction ← — — — — — — — — — — — — — — — — — →  View from viewpoint of user b Display object Display object Curvature of trajectory Guide images (a) Non-viewpoint-converted display object (b) Viewpoint-converted display object

START

Obtain vehicle-related information ⌐∽S11

Generate display object ⌐∽S12

Render display object ⌐∽S13

Project display object ⌐∽S14

END

START

Generate guide route ⌐∽S21

Convert viewpoint ⌐∽S22

Generate display object ⌐∽S23

Arrange display object ⌐∽S24

END

FIG. 7A

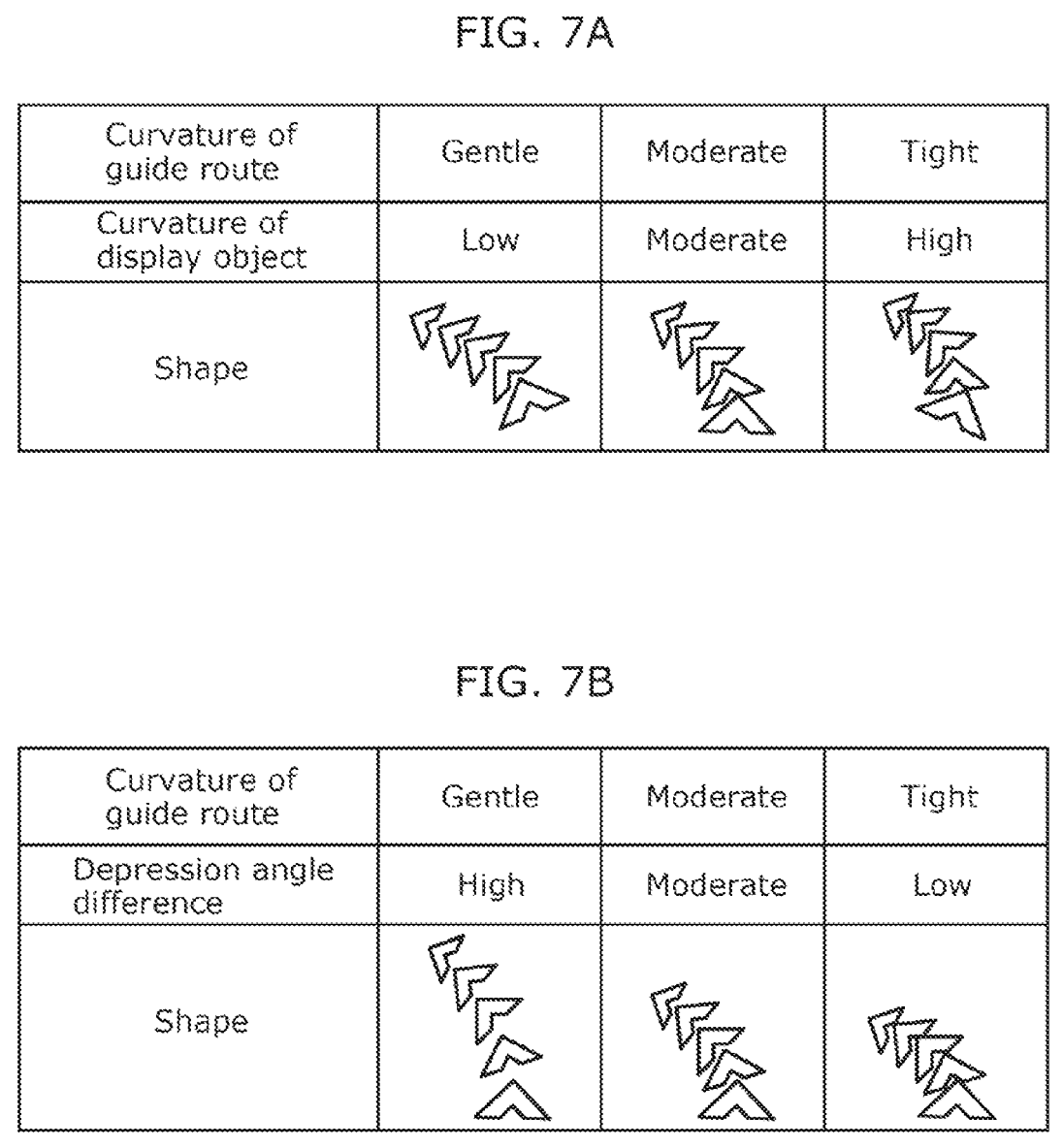

| Curvature of guide route | Gentle | Moderate | Tight |
|---|---|---|---|
| Curvature of display object | Low | Moderate | High |
| Shape | | | |

FIG. 7B

| Curvature of guide route | Gentle | Moderate | Tight |
|---|---|---|---|
| Depression angle difference | High | Moderate | Low |
| Shape | | | |

| Shape of guide route | Gentle/simple | Moderate | Tight/complicated |
|---|---|---|---|
| Number of guide images | 3 | 5 | 7 |
| Complicatedness | Low | Moderate | High |
| Shape | | | |

Yaw axis — Pitch axis
Roll axis
Guide image

| Distance to guide node | Far | Moderate | Close |
|---|---|---|---|
| Depression angle difference | High | Moderate | Low |
| Shape | | | |

FIG. 7F
| Distance to guide node | Far | Moderate | Close |
|---|---|---|---|
| Apex angle | Narrow | Moderate | Wide |
| Shape | | | |
Apex angle
FIG. 7G
| Distance to guide node | Far | Moderate | Close |
|---|---|---|---|
| Shape | | | |
FIG. 8A
PRIOR ART
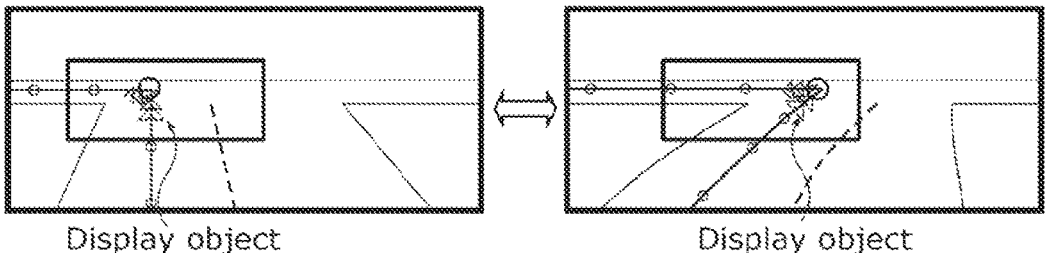
Display object        Display object
FIG. 8B
PRIOR ART
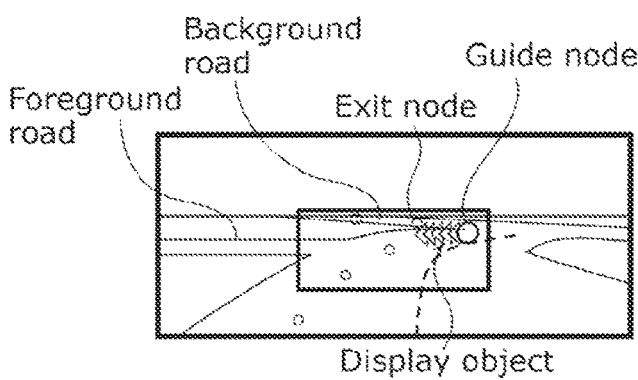
Background
road
Guide node
Foreground
road
Exit node
Display object

FIG. 10

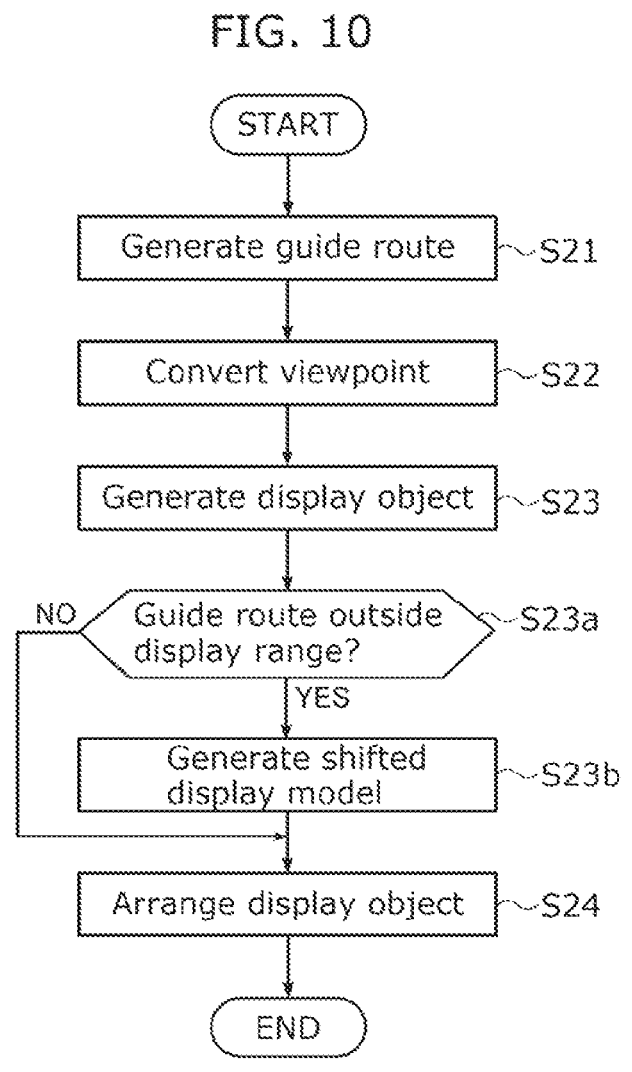

START

Generate guide route ⸺S21

Convert viewpoint ⸺S22

Generate display object ⸺S23

Guide route outside display range? ⸺S23a

NO

YES

Generate shifted display model ⸺S23b

Arrange display object ⸺S24

END

DISPLAY DEVICE, DISPLAY METHOD, AND STORAGE MEDIUM

CROSS REFERENCE TO RELATED APPLICATIONS

The present application is based on and claims priority of Japanese Patent Application No. 2023-075180 filed on Apr. 28, 2023.

FIELD

The present disclosure relates to a display device, a display method, and a storage medium.

BACKGROUND

A head-up display (HUD) device that is equipped in a vehicle is conventionally known. A HUD projects light that forms an image onto a light-transmissive display medium, and the light is reflected off the display medium toward the user, allowing the user to see both the real-life scene and the image indicated by the light as a virtual image that are beyond the display medium.

For example, Patent Literature (PTL) 1 discloses a display system for displaying on a display an augmented reality (AR) route, which is a virtual image, as an overlay on top of the real-life scene viewed by the user.

CITATION LIST

Patent Literature

PTL 1: Japanese Unexamined Patent Application Publication No. 2020-159953

SUMMARY

Technical Problem

However, the method according to PTL 1 can be improved upon.

In view of this, the present disclosure provides, for example, a display device capable of improving upon the above related art.

Solution to Problem

A display device according to one aspect of the present disclosure includes: a controller that determines a form in which to display a display object indicating a guide image that is based on a route a vehicle is scheduled to drive on; and a display that projects light that forms the display object in the form determined by the controller onto a display medium in the vehicle that reflects the light toward a user in the vehicle, making the display object that is displayed beyond the display medium visible to the user as a virtual image. When a condition related to driving of the vehicle is satisfied, the controller determines the form in which to display the display object so as to give the display object a shape corresponding to a view of the virtual image from an angle of depression greater than an angle of depression corresponding to a view of the virtual image from a viewpoint of the user.

Advantageous Effects

The display device, etc., according to one aspect of the present disclosure can display a display object that allows the user to correctly and easily recognize the real-life route.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 7A illustrates forms in which a display object is displayed in accordance with the curvature of the guide route and the curvature of the display object.

FIG. 7B illustrates forms in which a display object is displayed in accordance with the curvature and the depression angle difference of the guide route.

FIG. 7F illustrates guide images according to the distance to the guide node and the apex angle of the guide node.

FIG. 7G illustrates guide images according to the distance to the guide node.

FIG. 8A illustrates a display object and a route when the direction of travel of a vehicle and the route are parallel and when the direction of travel of the vehicle and the route are not parallel, in a conventional display device.

FIG. 8B illustrates a case in which a display object is formed using only the guide node and the exit node.

FIG. 10 is a flowchart illustrating an operation example of a display device according to a variation of an embodiment of the present disclosure.

DESCRIPTION OF EMBODIMENT(S)

Hereinafter, embodiments will be described with reference to the drawings. Each of the embodiments described below indicates a general or specific example. The numerical values, shapes, materials, elements, arrangement and connection of the elements, steps, order of the steps, etc., shown in the following embodiments are mere examples and are not intended to limit the present disclosure. Among elements in the following embodiments, those not in any of the independent claims are described as optional elements.

Each figure is schematically illustrated and not necessarily a precise depiction. In the figures, elements that are essentially the same are given the same reference signs, and repeated description may be omitted or simplified.
Embodiment First, display device 1, a display method, and a storage medium according to the present embodiment will be described with reference to FIG. 1 through FIG. 4B.

Figure 1:
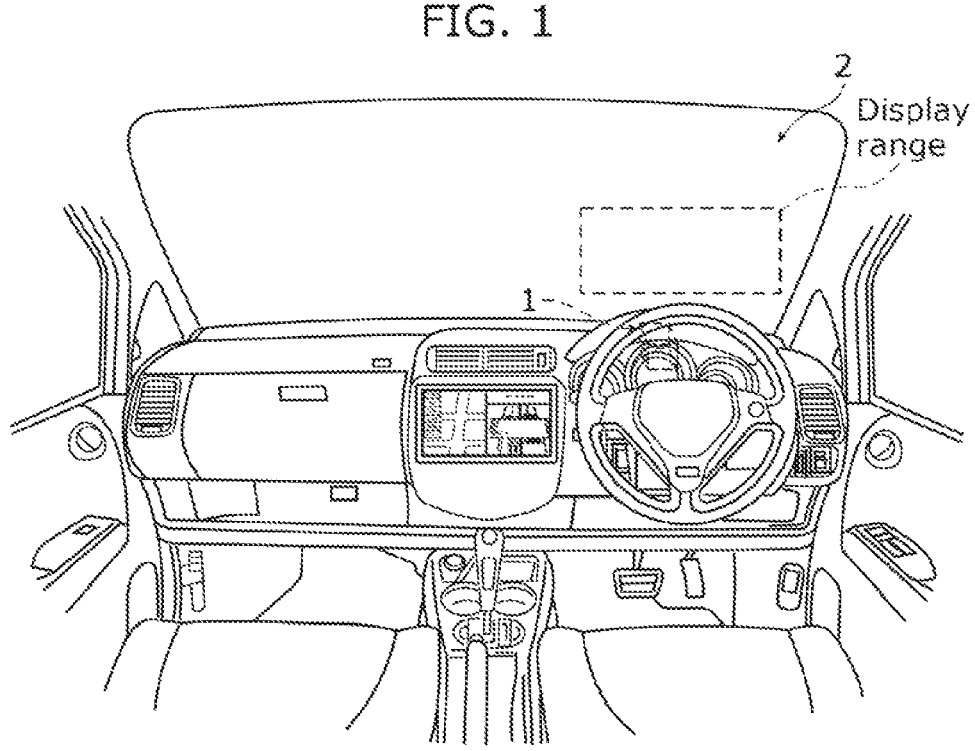
FIG. 1 illustrates the interior of a vehicle in which a display device according to an embodiment of the present disclosure is provided.
Figure 2:
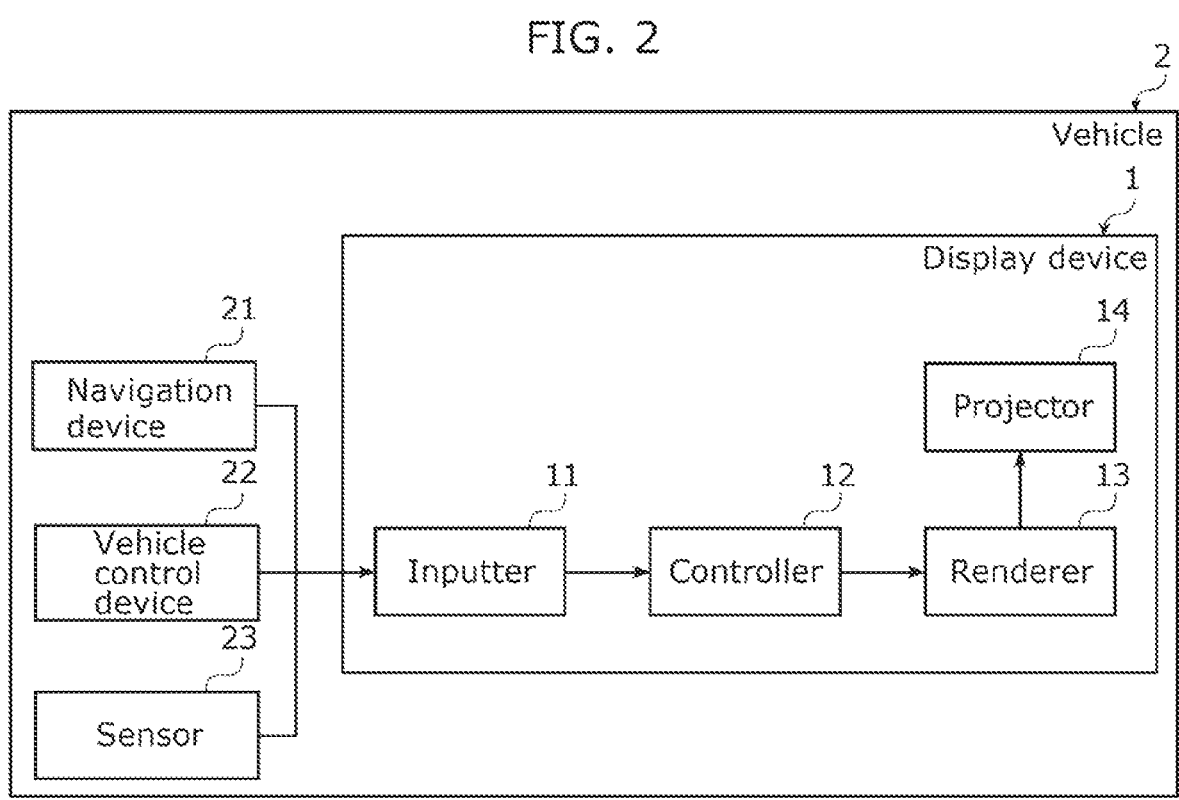
FIG. 2 is a block diagram illustrating a vehicle.
Figure 3:
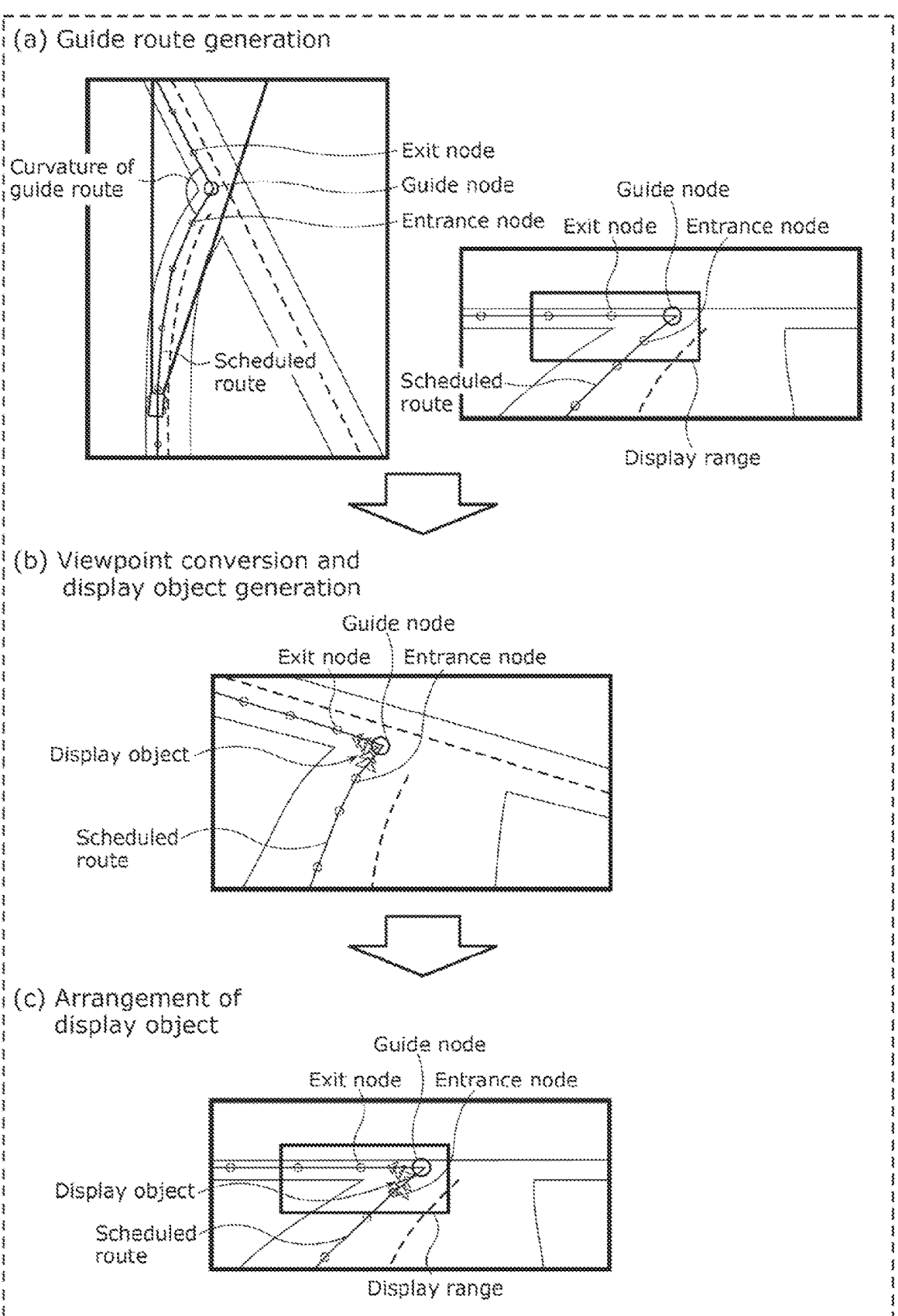
FIG. 3 illustrates the series of processes from the generation of a guide route to the placement of a display object in an embodiment of the present disclosure.
Figure 4A:
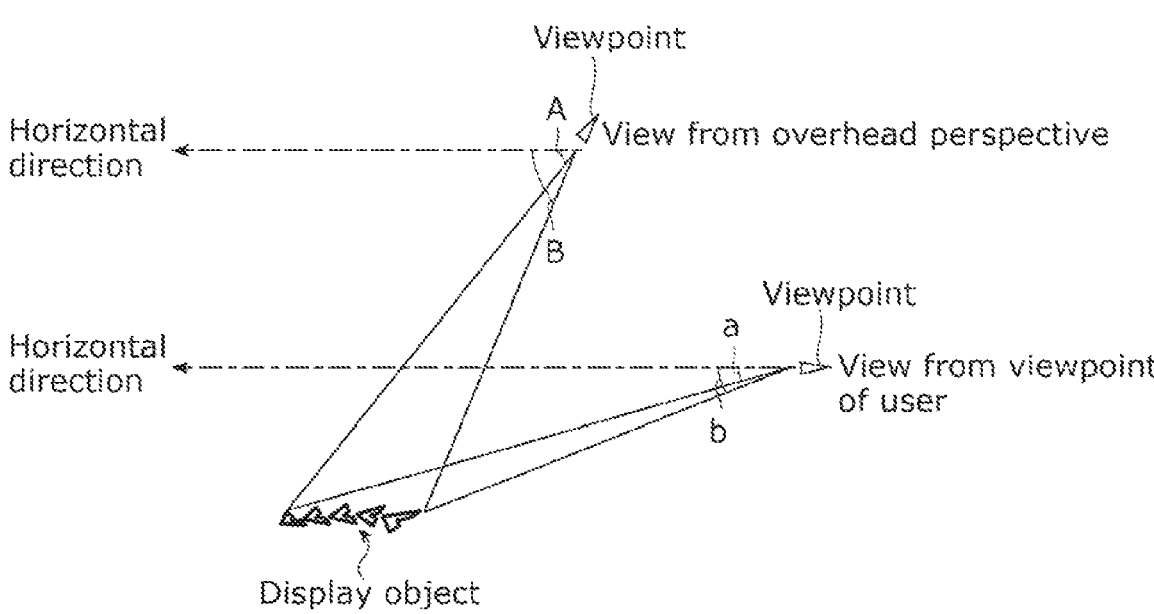
FIG. 4A is for explaining depression angle difference.
Figure 4B:
FIG. 4B illustrates a non-viewpoint-converted display object and a viewpoint-converted display object according to an embodiment of the present disclosure.

FIG. 1 illustrates the interior of vehicle 2 in which display device 1 according to the embodiment is provided. FIG. 2 is a block diagram illustrating vehicle 2. FIG. 3 illustrates the series of processes from the generation of the guide route to the placement of the display object in the embodiment. In (a) in FIG. 3, the left figure illustrates, from directly above, a guide route generated using a guide node, an entrance node, and an exit node, and the right figure illustrates the guide route from the viewpoint of the user. In FIG. 3, (b) illustrates the viewpoint conversion of the display object arranged along the guide route, and the generation of the display object from the overhead perspective. In FIG. 3, (c) illustrates an example in which the viewpoint-converted display object is arranged along the guide route. FIG. 4A is for explaining depression angle difference. FIG. 4B illustrates a non-viewpoint-converted display object and a viewpoint-converted display object according to the embodiment.
<Functional Configuration>

As illustrated in FIG. 1 and FIG. 2, display device 1 is a HUD provided in vehicle 2, for example. Display device 1 emits display light, which is light that forms a display object, toward a light-transmissive display medium, and reflects the display light off the display medium such that the display light is incident on the eyes of the user. For example, in embodiments in which display device 1 is used in vehicle 2, display device 1 reflects the display light emitted to the display medium, such as a light-transmissive front windshield or light-transmissive combiner, to make the display light incident on the eyes of the user. This allows the user to three-dimensionally view the display light as a virtual image while at the same time recognizing the real-life scenery beyond the display medium.

The display light is light that causes an image—a virtual image—to be three-dimensionally displayed on the display medium. The image is a still or moving image, and depicts one or more of a numeral, a letter, or a graphic.

Display device 1 determines the form in which to display the display light to be projected toward the display medium based on information from a plurality of devices equipped in vehicle 2.

The plurality of devices include, for example, navigation device 21, vehicle control device 22, and sensor 23.

Navigation device 21 is a navigation system equipped in vehicle 2. Navigation device 21 is capable of using map data to set a scheduled route for vehicle 2. The scheduled route is an optimal route from the current location to a destination along which vehicle 2 is scheduled to drive on. Navigation device 21 is also capable of providing, for example, traffic information for the surrounding area and setting a scheduled route that has been changed based on traffic information for the surrounding area. Navigation device 21 outputs vehicle-related information including the set scheduled route to display device 1. The scheduled route is included in the route according to the present disclosure.

The scheduled route is a route along which vehicle 2 is scheduled to drive on, and is superimposed on the actual road that can be seen beyond the display medium. The scheduled route includes a guide node, an entrance node, and an exit node. The guide node indicates a point at which vehicle 2 is to change course, the entrance node indicates a point before vehicle 2 enters the guide node, and the exit node leads vehicle 2 through the guide node. The guide node, the entrance node, and the exit node are determined by navigation device 21, and are included in the vehicle-related information. The guide node, the entrance node, and the exit node may be determined by controller 12 of display device 1 based on the scheduled route.

Vehicle control device 22 carries out various control related to the driving of vehicle 2. For example, vehicle control device 22 controls the RPM of the engine, the transmission, and the brake system in accordance with operations performed by the driver and the driving state. Vehicle control device 22 outputs the vehicle-related information including the various control related to the driving of vehicle 2 to display device 1.

Sensor 23 is a vehicular sensor equipped in vehicle 2. Examples include a camera sensor that detects obstructions in the vicinity of vehicle 2 and detects the surrounding environment of vehicle 2 such as the shape of the road, a distance sensor that detects the distance from vehicle 2 to an obstruction, a speed sensor that detects the driving speed of vehicle 2, an acceleration sensor that detects the acceleration of vehicle 2, and a steering angle sensor that detects the steering angle. Vehicle control device 22 outputs to display device 1 vehicle-related information including, for example, the surrounding environment, the distance from vehicle 2 to an obstruction, the driving speed, the acceleration of vehicle 2, and the steering angle.

Display device 1 includes inputter 11, controller 12, renderer 13, and projector 14.

Inputter 11 is an input interface that obtains vehicle-related information output by the plurality of devices. Inputter 11 outputs the obtained vehicle-related information to controller 12.

As illustrated in FIG. 2 and FIG. 3, controller 12 generates the display object based on the vehicle-related information obtained by inputter 11, and determines the form in which to display the generated display object. More specifically, based on the obtained vehicle-related information, when a condition related to the driving of vehicle 2 is satisfied, controller 12 uses the guide node, the entrance node, and the exit node to generate the guide route for generating the display object. The guide route is a section of the scheduled route including the guide node, the entrance node, and the exit node, and is for generating and arranging the display object. Controller 12 is capable of generating the display object in accordance with the guide route and determining the form in which to display the display object so as to give the display object a shape corresponding to a view of the virtual image from an angle of depression greater than an angle of depression corresponding to a view of the virtual image from the viewpoint of the user.

Here, the display object is an image displayed by the display light as a virtual image on the display medium, and includes a guide image displayed along the scheduled route. The guide image is exemplified as but not limited to an image of an arrow; the guide image maybe any known image capable to guiding the user. The display object according to the present embodiment includes a plurality of guide images displayed along the scheduled route. Accordingly, controller 12 generates a plurality of guide images according to the shape of the scheduled route indicated in the vehicle-related information, and determines the form in which to display the plurality of generated guide images.

Here, the form in which to display the display object is determined according to, for example, the portion of the route that is in the surrounding area of the guide node (i.e., the guide route), the distance from vehicle 2 to the guide node, the speed at which to change the display object in accordance with the guide route, and the driving speed of vehicle 2 in the surrounding area of the guide node. The form in which to display the display object includes the position in which to arrange the display object, the curvature of the display object, the depression angle difference of the display object, the number of guide images, the angle of rotation of the plurality of guide images, the apex angle of the guide images, the size of the guide images, and the speed at which to change the display object. The form in which to display the display object may be determined so that the plurality of guide images do not overlap one another. The guide route is included in the route according to the present disclosure.

For example, when a condition related to the driving of vehicle 2 is satisfied, controller 12 converts the viewpoint of the three-dimensional virtual image display object arranged along the scheduled route displayed on the display medium from the viewpoint of the user to a viewpoint from a hypothetical overhead perspective, generates the display object, and determines the form in which to display the display object.

Here, the curvature of the trajectory following the alignment of the plurality of guide images displayed on the display medium (i.e., the curvature of the display object) is lower than the curvature of the trajectory following the alignment of the plurality of guide images depicted in the virtual image as viewed from the viewpoint of the user. The depression angle difference of the plurality of guide images displayed on the display medium is greater than the depression angle difference of the virtual image as viewed from the viewpoint of the user.

As used herein, the depression angle difference is, in a view of the display object from the viewpoint of the user with respect to the horizontal direction, a value calculated by subtracting angle a, which is the angle between the horizontal direction and a straight line connecting the head end of the display object and the viewpoint, from angle b, which is the angle between the horizontal direction and a straight line connecting the tail end of the display object and the viewpoint, as illustrated in FIG. 4A. In a case in which the display object is viewed from a hypothetical overhead perspective, the depression angle difference is a value calculated by subtracting angle A, which the an angle between the horizontal direction and a straight line connecting the head end of the display object and the viewpoint, from angle B, which is the angle between the horizontal direction and a straight line connecting the tail end of the display object and the viewpoint. The depression angle difference (B−A) of the plurality of guide images displayed on the display medium is greater than the depression angle difference (b−a) of the virtual image as viewed from the viewpoint of the user.

For example, as illustrated in (a) in FIG. 4B, if viewpoint conversion is not performed, the curvature of the trajectory following the alignment of the plurality of guide images viewed from the viewpoint of the user appears higher than when the plurality of guide images are viewed from the overhead perspective. The depression angle difference of the plurality of guide images when viewed from the viewpoint of the user appears smaller than from the overhead perspective of the plurality of guide images. Accordingly, when each of the plurality of guide images is three-dimensional, in a view of the display medium from the viewpoint of the user, the plurality of three-dimensional guide images appear compressed and distorted. This makes it more difficult for the user to recognize the guidance depicted by the display object.

However, in the present embodiment, as illustrated in (b) in FIG. 4B, controller 12 generates a display object that has been viewpoint-converted so as to have the shape of a three-dimensional display object as viewed from a hypothetical overhead perspective, and determines the form in which to display the generated display object. With this, a three-dimensional display object characterized by a higher curvature, lower depression angle difference, and reduced distortion can be displayed on the display medium.

Here, the condition related to the driving of vehicle 2 is a condition that requires the user to operate the steering wheel of vehicle 2 on the scheduled route. A condition that requires the user to operate the steering wheel of vehicle 2 is a condition that vehicle 2 changes course on the scheduled route. More specifically, a condition that requires the user to operate the steering wheel of vehicle 2 includes at least one of a condition that the scheduled route includes an intersection or a curve, a condition that the scheduled route includes a curve between vehicle 2 and an intersection, a condition that the scheduled route includes an additional intersection or an additional curve between vehicle 2 and an intersection or a curve, or a condition that vehicle 2 changes course. The condition that vehicle 2 changes course includes, for example, a condition that the scheduled route includes an intersection or a curve and vehicle 2 changes course immediately before the intersection or the curve, and a condition for avoiding another moving body or an obstruction such as a structure.

For example, the condition that requires the user to operate the steering wheel of vehicle 2 is a condition that the user drives through a curve, turns right, or turns left by operating the steering wheel of vehicle 2, a condition that even when vehicle 2 is currently driving straight, the scheduled route includes a curved road, a right-turn intersection, or a left-turn intersection that the user can see, and the user will operate the steering wheel of vehicle 2, or a condition that the user will operate the steering wheel of vehicle 2 in order to avoid an obstruction. Accordingly, the condition that requires the user to operate the steering wheel of vehicle 2 includes a condition that the user is currently operating the steering wheel and a condition that the user will operate the steering wheel in the near future. Here, an intersection includes a simple branch or merge regardless of the presence of a traffic signal.

Controller 12 determines the form in which to display the display object, and outputs the determined form to renderer 13.

Renderer 13 obtains the determined form from controller 12, and renders the display object in the form determined by controller 12 to project the determined display object from projector 14 onto the display medium. For example, renderer 13 adjusts the size, shape, color, brightness, etc., of the display object in accordance with the determined form. Renderer 13 outputs the rendering result to projector 14.

Based on the rendering result obtained from renderer 13, projector 14 projects light (display light) that forms the display object in the form determined by controller 12 onto a display medium in vehicle 2. Since the display light projected onto the display medium is reflected toward the user in vehicle 2 by the display medium, the display object, which is the display light displayed beyond the display medium, is visible to the user as a virtual image.

Renderer 13 and projector 14 thus configured are included in the display of the present disclosure.

<Processing Operations>

Next, processing operations of display device 1, the display method, and the storage medium according to the present embodiment will be described with reference to FIG. 5.

Figures 5, 6:
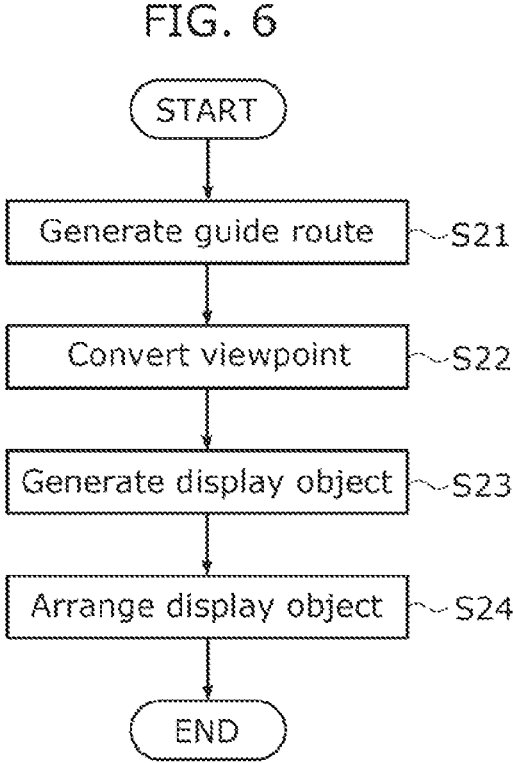
FIG. 5 is a flowchart illustrating Operation Example 1 of a display device according to an embodiment of the present disclosure.
FIG. 6 is a flowchart illustrating Operation Example 2 of a display device according to an embodiment of the present disclosure.

FIG. 5 is a flowchart illustrating Operation Example 1 of display device 1 according to the embodiment.

Operation Example 1

First, the plurality of devices equipped in vehicle 2 transmit the vehicle-related information to display device 1. Display device 1 consequently obtains the vehicle-related information (S11). In other words, the vehicle-related information is input to inputter 11 of display device 1. Inputter 11 outputs the input vehicle-related information to controller 12.

Next, controller 12 generates the display object based on the obtained vehicle-related information, and if a condition related to the driving of vehicle 2 that is based on the vehicle-related information is satisfied, determines the form in which to display the generated display object (S12). The generating of the display object and the determining of the form in which to display the display object will be described in greater detail later.

Next, controller 12 outputs the determined form to renderer 13.

Next, renderer 13 obtains the determined form from controller 12 and renders the display object according to the obtained form (S13). Renderer 13 outputs the rendering result to projector 14.

Next, based on the rendering result obtained from renderer 13, projector 14 projects display light that forms the display object toward the display medium in the determined form (S14). Here, since renderer 13 is also rendering the scheduled route, projector 14 projects light that forms the scheduled route along with the display light toward display medium. Since the display light is reflected toward the user by the display medium, the display object displayed beyond the display medium is recognizable to the user as a virtual image. Display device 1 then ends the flowchart illustrated in FIG. 5.

Operation Example 2

Next, the processing operation of S12 in FIG. 5 will be described in greater detail with reference to FIG. 6.

FIG. 6 is a flowchart illustrating Operation Example 2 of display device 1 according to the embodiment.

First, controller 12 obtains the scheduled route indicated in the vehicle-related information. When a condition related to the driving of vehicle 2 is satisfied, controller 12 uses the guide node, the entrance node, and the exit node of the scheduled route to generate the guide route for generating the display object (S21).

Next, when a condition related to the driving of vehicle 2 is satisfied, controller 12 converts the viewpoint of the display object (S22). More specifically, controller 12 converts the viewpoint of the three-dimensional display object arranged along the guide route included in scheduled route displayed on the display medium from the viewpoint of the user to a viewpoint from a hypothetical overhead perspective. In other words, controller 12 converts the shape of the three-dimensional display object as if seen by the user in the horizontal direction to a shape as if seen by the user from an overhead perspective.

With this, the curvature of the trajectory following the alignment of the plurality of guide images displayed on the display medium is lower than the curvature of the trajectory following an alignment of the plurality of guide images depicted in the virtual image as viewed from the viewpoint of the user. The depression angle difference of the plurality of guide images displayed on the display medium is greater than the depression angle difference of the virtual image as viewed from the viewpoint of the user. Accordingly, even if the guide image of the arrow appears compressed and distorted when seen by the user from the horizontal direction, distortion of the guide image of the arrow can be reduced when seen by the user from an overhead perspective.

Next, controller 12 generates the viewpoint-converted display object so that a three-dimensional display object with reduced distortion is displayed on the display medium (S23).

Next, controller 12 determines the form in which to display the display object and arranges the display object (S24). Controller 12 then proceeds to step S14 shown in FIG. 5. Display device 1 then ends the flowchart illustrated in FIG. 5.

Next, the method of determining the form in which to display the display object will be described with reference to FIG. 7A through FIG. 7G.

Figures 7C, 7D, 7E:
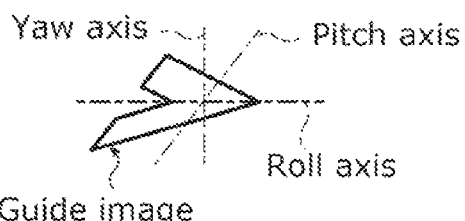
FIG. 7C illustrates forms in which a display object is displayed in accordance with the shape of the guide route, the number of guide images, and the complicatedness of the guide images.
FIG. 7D illustrates the angle of rotation of a guide image.
FIG. 7E illustrates forms in which a display object is displayed in accordance with the distance to the guide node and the depression angle difference of the guide node.

FIG. 7A illustrates forms in which the display object is displayed in accordance with the curvature of the guide route and the curvature of the display object. FIG. 7B illustrates forms in which the display object is displayed in accordance with the curvature and the depression angle difference of the guide route. FIG. 7C illustrates forms in which the display object is displayed in accordance with the shape of the guide route, the number of guide images, and the complicatedness of the guide images. FIG. 7D illustrates the angle of rotation of the guide image. FIG. 7E illustrates forms in which the display object is displayed in accordance with the distance to the guide node and the depression angle difference of the guide node. FIG. 7F illustrates guide images according to the distance to the guide node and the apex angle of the guide node. FIG. 7G illustrates guide images according to the distance to the guide node.

More specifically, in order for the display object to be correctly recognized by the user, controller 12 determines the form in which to display the display object according to: the position in which to arrange the display object in accordance with the guide route; the guide route itself; the distance from vehicle 2 to the guide node; the speed at which to change the display object in accordance with the guide route; and the driving speed of vehicle 2 in the surrounding area of the guide node.

Controller 12 changes the position in which to arrange the display object according to the guide route. For example, controller 12 determines to arrange the display object along the shape of the guide route. More specifically, controller 12 determines to arrange the display object according the shape of the guide route, as illustrated in (c) in FIG. 3.

Controller 12 changes the display object according to the guide route. For example, according to the guide route, controller 12 changes at least one of the curvature of the display object, the depression angle difference of the display object, the number of guide images, or the angle of rotation of the guide images.

More specifically, as illustrated in FIG. 7A, controller 12 calculates the curvature of the guide route and determines, according to the calculated curvature, the curvature of the trajectory that follows the alignment of the guide images, i.e., the curvature of the display object. For example, controller 12 determines the form in which to display the display object such that the curvature of the display object is lower the gentler the curve of the guide route is, i.e., the lower the curvature of the guide route is. When the guide route has a moderate curvature, controller 12 determines the form in which to display the display object such that the curvature of the display object is moderate. Moreover, controller 12 determines the form in which to display the display object such that the curvature of the display object is higher the tighter the curve of the guide route is, i.e., the higher the curvature of the guide route is. Note that a high curvature means a curvature higher than a reference moderate curvature and a low curvature means a curvature lower than a reference moderate curvature.

Controller 12 calculates the depression angle difference of the display object arranged on the guide route and determines the depression angle difference of the display object according to the calculated depression angle difference, as illustrated in FIG. 7B. For example, controller 12 determines the form in which to display the display object such that the depression angle difference of the display object is higher the gentler the curve of the guide route is, i.e., the lower the curvature of the guide route is. When the guide route has a moderate curvature, controller 12 determines the form in which to display the display object such that the depression angle difference of the display object is moderate. Moreover, controller 12 determines the form in which to display the display object such that the depression angle difference of the display object is lower the tighter the curve of the guide route is, i.e., the higher the curvature of the guide route is. Note that a high depression angle difference means a depression angle difference higher than a reference moderate depression angle difference and a low depression angle difference means a depression angle difference lower than a reference moderate depression angle difference.

Controller 12 determines the number of guide images to be used in the display object according to the guide route, as illustrated in FIG. 7C. For example, controller 12 determines the form in which to display the display object such that the number of guide images decreases to approximately three as the curve of the guide route is gentler or the route is simpler. In this case, the visual complicatedness felt by the user is low. When the guide route is moderate, controller 12 determines the form in which to display the display object such that the display object includes approximately five guide images. In this case, the visual complicatedness felt by the user is moderate. For example, controller 12 determines the form in which to display the display object such that the number of guide images increases to approximately seven as the curve of the guide route is tighter or the route is more complicated. In this case, the visual complicatedness felt by the user is high. Note that a configuration in which controller 12 increases the number only when the curvature of the guide route is high, such as a guide route having a complicated shape like an S-curve, is acceptable. Note that a high number of guide images means a number higher than a reference moderate number and a low number of guide images means a number lower than a reference moderate number.

Controller 12 determines the angle of rotation of the guide images according to the guide route, as illustrated in FIG. 7D. For example, when the guide image is an arrow, controller 12 determines the form in which to display the display image such that the roll angle is larger the higher the curvature of the guide route and the roll angle is smaller the lower the curvature of the guide route, where the roll angle is the angle of rotation around the roll axis extending front and back. Controller 12 also determines the form in which to display the display image such that the yaw angle is larger the higher the curvature of the guide route and the yaw angle is smaller the lower the curvature of the guide route, where the yaw angle is the angle of rotation around the yaw axis extending up and down. Controller 12 also determines the form in which to display the display image such that the pitch angle is above the horizontal plane when the guide route is uphill and the pitch angle is below the horizontal plane when the guide route is downhill, where the pitch angle is the angle of rotation around the pitch axis extending right and left. Note that a high angle of rotation means an angle of rotation higher than a reference moderate angle of rotation and a low angle of rotation means an angle of rotation lower than a reference moderate angle of rotation.

Controller 12 changes the display object according to the distance from vehicle 2 to the guide node. According to the distance from vehicle 2 to the guide node, controller 12 changes at least one of the depression angle difference of the display object, the apex angle of each guide image, or the size of each guide image.

More specifically, controller 12 calculates the depression angle difference of the display object and determines the depression angle difference of the display object according to the calculated depression angle difference of the display object, as illustrated in FIG. 7E. For example, controller 12 determines the form in which to display the display object such that the depression angle difference of the display object is higher the longer the distance from vehicle 2 to the guide node is. For example, controller 12 determines the form in which to display the display object such that the depression angle difference of the display object is moderate if the distance from vehicle 2 to the guide node is moderate. For example, controller 12 determines the form in which to display the display object such that the depression angle difference of the display object is lower the shorter the distance from vehicle 2 to the guide node is. Note that a long distance means a distance longer than a reference moderate distance and a short distance means a distance shorter than a reference moderate distance.

Controller 12 determines the apex angle of each guide image according to the distance from vehicle 2 to the guide node, as illustrated in FIG. 7F. For example, when the guide image is an arrow, controller 12 determines the form in which to display the display object such that the apex angle of the arrow is smaller the longer the distance from vehicle 2 to the guide node is. For example, when the guide image is an arrow, controller 12 determines the form in which to display the display object such that the apex angle of the arrow is moderate if the distance from vehicle 2 to the guide node is moderate. For example, when the guide image is an arrow, controller 12 determines the form in which to display the display object such that the apex angle of the arrow is larger the shorter the distance from vehicle 2 to the guide node is. Note that a large apex angle means an apex angle larger than a reference moderate apex angle and a small apex angle means an apex angle smaller than a reference moderate apex angle.

Controller 12 determines the size of each guide image according to the distance from vehicle 2 to the guide node, as illustrated in FIG. 7G. For example, controller 12 determines the form in which to display the guide image such that the size of the guide image is smaller the longer the distance from vehicle 2 to the guide node is. For example, controller 12 determines the form in which to display the guide image such that the size of the guide image is moderate if the distance from vehicle 2 to the guide node is moderate. For example, controller 12 determines the form in which to display the guide image such that the size of the guide image is larger the shorter the distance from vehicle 2 to the guide node is. Note that a large guide image means a guide image larger than a reference moderately sized guide image and a small guide image means a guide image smaller than a reference moderately sized guide image.

Controller 12 changes the speed at which to change the display object according to the guide route. Controller 12 may alter the speed at which to change the guide image corresponding to at least a portion of the plurality of guide images according to the guide route, and decide on the altered speed.

More specifically, controller 12 determines the form in which to display the display object such that when near the guide node, the speed of change of the display object is faster the tighter the curve of the guide route is, i.e., the higher the curvature of the guide route is. Stated differently, controller 12 determines the form in which to display the display object such that when near the guide node, the speed of change of the display object is slower the more gentle the curve of the guide route is, i.e., the lower the curvature of the guide route is.

More specifically, controller 12 determines the form in which to display the display object such that when near a curve before and in the vicinity of the guide node, the speed of change of the display object is faster the higher the curvature of the curve is. Stated differently, controller 12 determines the form in which to display the display object such that when near a curve before the guide node on the guide route, the speed of change of the display object is slower the lower the curvature of the curve is.

For example, when the curvature of the curve is high, controller 12 determines the form such that the rate of change of the angle of rotation (i.e., the angular velocity) of one guide image is greater than or equal to 90° per second. For example, when the curvature of the curve is low, controller 12 determines the form such that the rate of change of the angle of rotation of one guide image is less than or equal to 45° per second. The rate of change of the angle of rotation given here is merely one example; the present disclosure is not limited to the rate of change of the angle of rotation exemplified in the present embodiment.

As another example, when the curvature of the curve is high, controller 12 determines the form such that the number of guide images changes from five to three over a period of approximately 0.5 seconds. When the curvature of the curve is low, controller 12 determines the form such that the number of guide images changes from five to three over a period of approximately one second. The number and time regarding the guide images given here is merely one example; the present disclosure is not limited to the number and time regarding the guide images exemplified in the present embodiment.

When, after controller 12 has determined that a condition related to the driving of vehicle 2 has not been satisfied, controller 12 subsequently determines that the condition related to the driving of vehicle has been satisfied, controller 12 may alter the speed at which to change the display object in accordance with the curvature of the guide route indicating the guide node, the entrance node, and the exit node.

Controller 12 determines the speed at which to change the display object according to the driving speed of vehicle 2 in the surrounding area of the guide node.

More specifically, controller 12 determines the form in which to display the display object such that when vehicle 2 is near the guide node, the speed of change of the display object is faster the faster the driving speed of vehicle 2 is on the guide route in the vicinity of the guide node. More specifically, controller 12 determines the form in which to display the display object such that when vehicle 2 is near the guide node, the speed of change of the display object is slower the slower the driving speed of vehicle 2 is on the guide route.

More specifically, controller 12 determines the form in which to display the display object such that when near a curve before and in the vicinity of the guide node, the speed of change of the display object is faster the faster the driving speed of vehicle 2 is. Stated differently, controller 12 determines the form in which to display the display object such that when near a curve before the guide node, the speed of change of the display object is slower the slower the driving speed of vehicle 2 is.

For example, when the driving speed of vehicle 2 is fast near the curve, controller 12 determines the form such that the rate of change of the angle of rotation of one guide image is greater than or equal to 90° per second. For example, when the driving speed of vehicle 2 is slow near the curve, controller 12 determines the form such that the rate of change of the angle of rotation of one guide image is less than or equal to 45° per second. The rate of change of the angle of rotation given here is merely one example; the present disclosure is not limited to the rate of change of the angle of rotation exemplified in the present embodiment.

As another example, when the driving speed of vehicle 2 is fast near the curve, controller 12 determines the form such that the number of guide images changes from five to three over a period of approximately 0.5 seconds. When the driving speed of vehicle 2 is slow near the curve, controller 12 determines the form such that the number of guide images changes from five to three over a period of approximately one second. The number and time regarding the guide images given here is merely one example; the present disclosure is not limited to the number and time regarding the guide images exemplified in the present embodiment.

When, after controller 12 has determined that a condition related to the driving of vehicle 2 has not been satisfied, controller 12 subsequently determines that the condition related to the driving of vehicle has been satisfied, controller 12 alters the speed at which to change the display object in accordance with the speed of vehicle 2 approaching the guide node.

<Advantageous Effects>

Next, the advantageous effects of display device 1 according to the present embodiment will be described.

First, a conventional display device 1 will be described with reference to FIG. 8A.

FIG. 8A illustrates the display object and the route when the direction of travel of vehicle 2 and the route are parallel and when the direction of travel of vehicle 2 and the route are not parallel, in the conventional display device 1.

In the conventional display device 1, when a virtual image is displayed as an overlay on the real-life route, when the real-life route on which the virtual image is displayed as an overlay is viewed obliquely from the viewpoint of the user, the virtual image displayed as an overlay on the real-life route may appear compressed. For example, as illustrated in FIG. 8A, when the virtual image is viewed from the viewpoint of the user, the display object may appear compressed. In such cases, the user cannot correctly recognize the display object, and thus may not be able to correctly recognize the real-life route.

In contrast, display device 1 according to the present embodiment includes: controller 12 that determines the form in which to display a display object indicating a guide image that is based on a route vehicle 2 is scheduled to drive on; and a display that projects light that forms the display object in the form determined by controller 12 onto a display medium in vehicle 2 that reflects the light (display light) toward a user in vehicle 2, making the display object that is displayed beyond the display medium visible to the user as a virtual image. When a condition related to driving of vehicle 2 is satisfied, controller 12 determines the form in which to display the display object so as to give the display object a shape corresponding to a view of the virtual image from an angle of depression greater than an angle of depression corresponding to a view of the virtual image from a viewpoint of the user.

This makes it possible to display the display object as a virtual image on the display medium so as to have a shape corresponding to a view of the virtual image from an overhead perspective. Accordingly, it is possible to inhibit the display object from being displayed compressed on the display medium.

It is thus possible to display a display object that allows the user to correctly and easily recognize the real-life route.

The display method according to the present embodiment includes: determining a form in which to display a display object indicating a guide image that is based on a route vehicle 2 is scheduled to drive on; and projecting light that forms the display object in the form determined in the determining onto a display medium in vehicle 2 that reflects the light toward a user in vehicle 2, making the display object that is displayed beyond the display medium visible to the user as a virtual image. In the determining, when a condition related to driving of vehicle 2 is satisfied, the display object is given a shape corresponding to a view of the virtual image from an angle of depression greater than an angle of depression corresponding to a view of the virtual image from a viewpoint of the user.

This display method also achieves the same advantageous effects as described above.

The storage medium according to the present embodiment is a non-transitory computer-readable storage medium having recorded thereon a computer program for causing a computer to execute the display method.

This storage medium also achieves the same advantageous effects as described above.

In display device 1 according to the present embodiment, the display object includes a plurality of the guide images displayed along the route. A curvature of a trajectory following an alignment of the plurality of guide images displayed on the display medium is lower than a curvature of a trajectory following an alignment of the plurality of guide images depicted in the virtual image in the view from the viewpoint of the user.

This makes it possible to inhibit the display object from being displayed compressed. This makes it easier for the user to correctly recognize the display object.

In display device 1 according to the present embodiment, the display object includes a plurality of the guide images displayed along the route. A depression angle difference of the display object displayed on the display medium is greater than a depression angle difference of the virtual image in the view from the viewpoint of the user.

This makes it possible to inhibit the display object from being displayed compressed. This makes it easier for the user to correctly recognize the display object.

In display device 1 according to the present embodiment, the plurality of guide images are displayed not overlapping one another.

This makes it possible to inhibit the display object from being difficult to recognize by the user as a result of the guide images overlapping. This makes it easier for the user to correctly recognize the display object.

In display device 1 according to the present embodiment, the route includes a guide node, an entrance node, and an exit node. The guide node indicates a point at which vehicle 2 is to change course, the entrance node indicates a point before vehicle 2 enters the guide node, and the exit node leading vehicle 2 through the guide node. Controller 12 determines the form in which to display the display object using the guide node, the entrance node, and the exit node.

Here, a conventional display device will be described with reference to FIG. 8B. FIG. 8B illustrates a case in which the display object is formed using only the guide node and the exit node. For example, when the display object is formed using only the guide node and the exit node, the display object may appear as if it is guiding the user to the road that is in the foreground rather than to the road that is in the background, as illustrated in FIG. 8B. In such cases, the user may start traveling on the wrong route.

In contrast, in the present embodiment, since the guide route can be generated using the guide node, the entrance node, and the exit node, it is possible to generate a display object along the guide route. This allows the user to recognize the direction indicated by the guide route.

In display device 1 according to the present embodiment, the condition related to the driving of vehicle 2 is a condition that requires the user to operate the steering wheel of vehicle 2 at the guide node.

For example, a case which requires the user to operate the steering wheel is a case in which the user changes the direction of travel of vehicle 2 by operating the steering wheel of vehicle 2 while paying careful attention to the surroundings of vehicle 2.

Here, with the present embodiment, is it possible to display a display object that is easy for the user to see on the display medium. Accordingly, the user can correctly recognize the display object. Consequently, it can be expected that the user will drive vehicle 2 without going off course.

In display device 1 according to the present embodiment, the condition that requires the user to operate the steering wheel of vehicle 2 includes a condition that the route includes an intersection, a condition that the route includes a curve between vehicle 2 and the intersection, and a condition that the route includes an additional intersection or an additional curve between vehicle 2 and the intersection or the curve.

With this, it possible to display a display object that is easy for the user to see on the display medium when operation of the steering wheel by the user is required. Accordingly, the user can correctly recognize the display object. Consequently, it can be expected that the user will drive vehicle 2 without going off course.

In display device 1 according to the present embodiment, the condition that requires the user to operate the steering wheel of vehicle 2 includes a condition that vehicle 2 changes course on the route.

With this, it possible to display a display object that is easy for the user to see on the display medium when vehicle 2 changes course. Accordingly, the user can correctly recognize the display object. Consequently, it can be expected that the user will drive vehicle 2 without going off course.

In display device 1 according to the present embodiment, the condition that requires the user to operate the steering wheel of vehicle 2 includes a condition that the route includes an intersection or a curve and vehicle 2 changes course immediately before the intersection or the curve.

With this, it possible to display a display object that is easy for the user to see on the display medium when vehicle 2 changes course. Accordingly, the user can correctly recognize the display object. Consequently, it can be expected that the user will drive vehicle 2 without going off course.

In display device 1 according to the present embodiment, controller 12 changes the display object in accordance with the portion of the route that is in the surrounding area of the guide node.

With this, it is possible to change the display object according to the shape of the guide route, and thus possible to determine a form in which to display the display object that is suitable for the guide route. This makes it easier for the user to correctly recognize the display object.

In display device 1 according to the present embodiment, the route includes a guide node indicating a point at which vehicle 2 is to change course. Controller 12 changes at least one of the curvature of the trajectory following the alignment of the plurality of guide images (the curvature of the guide route), the depression angle difference of the display object, the total number of the plurality of guide images, or the angle of rotation of the plurality of guide images in accordance with the portion of the route that is in the surrounding area of the guide node.

For example, the higher the curvature of the display object, the higher the curvature of the guide route feels to the user, achieving the advantageous effect that the angle before and after the guide node (the curvature of the guide route) feels larger (higher) to the user.

Moreover, for example, the lower the depression angle difference of the display object, the higher the curvature of the display object feels to the user, achieving the advantageous effect that the angle before and after the guide node feels larger to the user.

Moreover, with the present embodiment, it is possible for controller 12 to arrange more guide images, and thus possible to form a complicated shape such as an S-shape via the display object.

By adjusting the roll angle in the angle of rotation of the guide image, it is possible to achieve the advantageous effect that the user will feel that the greater the roll angle is, the higher the curvature of the guide route is, and the lower the roll angle is, the lower the curvature of the guide route is. By adjusting the yaw angle, it is possible to achieve the advantageous effect that the user will feel that the greater the yaw angle is, the higher the curvature of the guide route is, and the lower the yaw angle is, the lower the curvature of the guide route is. By adjusting the pitch angle, it is possible to achieve the advantageous effect that the user will feel like they are going more steeply uphill the more upward from the horizontal plane the pitch angle is set, and going more steeply downhill the more downward from the horizontal plane the pitch angle is set.

With this, it is possible to change the display object according to the shape of the guide route, and thus possible to determine a form in which to display the display object that is suitable for the guide route. This makes it easier for the user to correctly recognize the display object.

In display device 1 according to the present embodiment, the route includes a guide node indicating a point at which vehicle 2 is to change course. Controller 12 changes at least one of the depression angle difference of the display object, the apex angle of each of the plurality of guide images, or the size of the plurality of guide images in accordance with the distance from vehicle 2 to the guide node.

For example, it is possible to achieve the advantageous effect that the user will feel like the guide node is farther from vehicle 2 the greater the depression angle difference is.

Moreover, it is possible to achieve the advantageous effect that the user will feel like the guide node is farther from vehicle 2 the narrower the apex angle of the guide image is.

Moreover, it is possible to achieve the advantageous effect that the user will perceive the distance from vehicle 2 to the guide node since the guide image can be shaped to perspective lines according to the distance from vehicle 2 to the guide node.

With this, it is possible to change the display object according to the distance from vehicle 2 to the guide node, and thus possible to determine the form in which to display the display object that is suitable for the guide route. This makes it easier for the user to correctly recognize the display object.

In display device 1 according to the present embodiment, controller 12 alters the speed at which to change the display object in accordance with the route.

With this, it is possible to determine the form in which to display the display object such that when near the guide node, the speed of change of the display object is faster the higher the curvature of the guide route is. Moreover, it is possible to determine the form in which to display the display object such that when near a curve before the guide node, the speed of change of the display object is faster the higher the curvature of the curve is. With this, it is possible to adjust the speed at which to change the display object according to the shape of the guide route. Accordingly, it can be expected that the guide route will be more easily recognized by the user.

In display device 1 according to the present embodiment, the route includes a guide node indicating a point at which vehicle 2 is to change course. Controller 12 alters the speed at which to change the display object in accordance with the driving speed of vehicle 2 in the surrounding area of the guide node.

With this, it is possible to determine the form in which to display the display object such that when vehicle 2 is near the guide node, the speed of change of the display object is faster the faster the driving speed of vehicle 2 on the guide route is. More specifically, it is possible to determine the form in which to display the display object such that when near a curve before the guide node, the speed of change of the display object is faster the faster the driving speed of vehicle 2 is. With this, it is possible to adjust the speed at which to change the display object according to the driving speed of vehicle 2 on the guide route. Accordingly, it can be expected that the guide route will be more easily recognized by the user.

In display device 1 according to the present embodiment, the route includes a guide node, an entrance node, and an exit node. The guide node indicates a point at which vehicle 2 is to change course, the entrance node indicates a point before vehicle 2 enters the guide node, and the exit node leading vehicle 2 through the guide node. When, after controller 12 has determined that the condition related to the driving of vehicle 2 has not been satisfied, controller 12 subsequently determines that the condition related to the driving of vehicle 2 has been satisfied, controller 12 alters the speed at which to change the display object in accordance with the curvature of the route indicating the guide node, the entrance node, and the exit node.

With this, consequently, when a condition related to the driving of vehicle 2 is satisfied, it is possible to determine a form in which to display the display object that is in accordance with the curvature of the guide route. Accordingly, it is easier for the user to correctly recognize the display object.

In display device 1 according to the present embodiment, the route includes a guide node indicating a point at which vehicle 2 is to change course. When, after controller 12 has determined that a condition related to the driving of vehicle 2 has not been satisfied, controller 12 subsequently determines that the condition related to the driving of vehicle 2 has been satisfied, controller 12 alters the speed at which to change the display object according to the speed of vehicle 2 approaching the guide node.

With this, consequently, when a condition related to the driving of vehicle 2 is satisfied, it is possible to adjust the speed at which to change the display object according to the driving speed of vehicle 2 on the guide route. Accordingly, it can be expected that the guide route will be more easily recognized by the user.

(Embodiment Variations)

First, the configuration of display device 1 according to a variation will be described with reference to FIG. 9.

Figure 9:
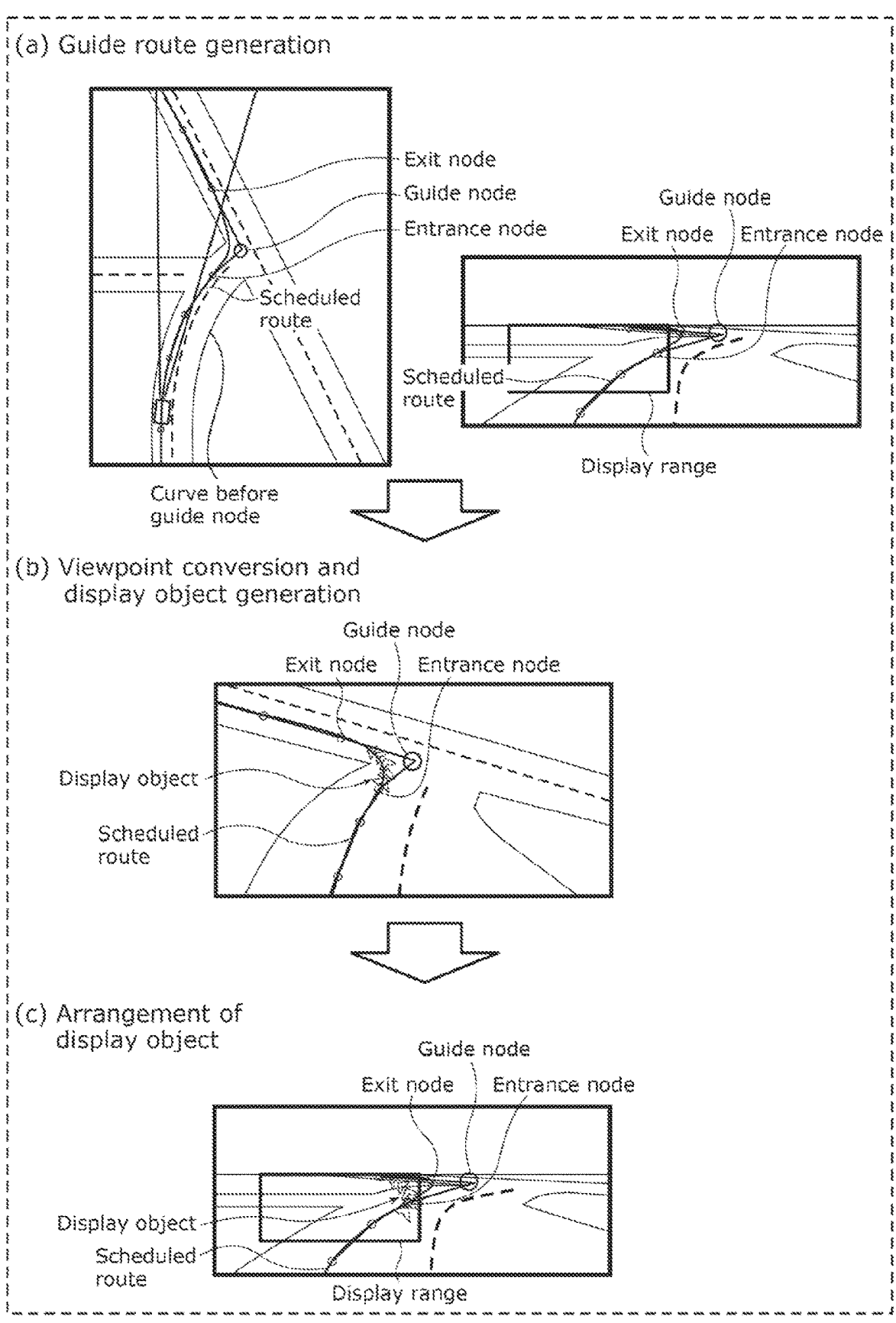
FIG. 9 illustrates the series of processes from the generation of a guide route to the placement of a display object in a variation of an embodiment of the present disclosure.

FIG. 9 illustrates the series of processes from the generation of the guide route to the placement of the display object in a variation of the embodiment. In (a) in FIG. 9, the left figure illustrates, from directly above, a guide route generated using a guide node, an entrance node, and an exit node, and the right figure illustrates the guide route from the viewpoint of the user. In FIG. 9, (b) illustrates the viewpoint conversion of the display object arranged along the guide route, and the generation of the display object from the overhead perspective. In FIG. 9, (c) illustrates an example in which the viewpoint-converted display object is arranged along the guide route.

The present variation differs from the embodiment in that a shifted display object is generated. Other configurations in the present variation are the same as in the embodiment unless otherwise noted, and the same configurations have the same reference signs and detailed description thereof will be omitted.

For example, when the scheduled route includes a curve, right turn, or left turn, or when the user operates the steering wheel of the vehicle in order to, for example, change course, there are cases in which the actual route scheduled to be driven falls outside the display range of the display. In such cases, the display object may be inappropriately displayed, making it difficult for the user to correctly recognize the scheduled route.

In view of this, in the present variation, when at least a portion of the display object is outside of the display range of the display medium, controller 12 determines the form in which to display the display object so as to shift the display object to be inside the display range.

More specifically, in cases in which the actual route scheduled to be driven falls outside the display range of the display and the guide route is not displayed in the display range, controller 12 shifts the display object to a position closest to the guide route inside the display range. For example, as illustrated in FIG. 9, even when the entrance node and the guide node of the guide route fall outside the display range, the display object is generated so that the entrance node that is located outside the display range is shifted to a position closest to the guide route inside the display range so as to be closer to the exit node that is located inside the display range.

In cases in which a shifted display object is generated, controller 12 determines the form in which to display the display object so as to change the color and/or the luminance of at least a portion of the display object that is inside the display range.

In the present variation, the form in which to display the display object includes the position in which to arrange the display object, the curvature of the display object, the depression angle difference of the display object, the number of guide images, the angle of rotation of the plurality of guide images, the apex angle of the guide images, the size of the guide images, the color of the guide images, the luminance of the guide images, and the speed at which to change the display object.

(Operation Example)

Next, processing operations for step S12 in FIG. 5 of display device 1, the display method, and the storage medium according to the present variation will be described with reference to FIG. 10.

FIG. 10 is a flowchart illustrating an operation example of display device 1 according to the variation of the embodiment.

Processing operations that are the same as in FIG. 6 have the same reference signs, and repeated description will be omitted where appropriate.

First, after steps S21 through S23, controller 12 determines whether the guide route is outside the display range (S23a). The field of view through the display range of the display medium may be set in advance, and in such cases, controller 12 can determine whether the guide route is outside the display range or not based on the direction of travel of vehicle 2 and the set field of view.

When controller 12 determines that the guide route is not outside the display range (NO in step S23a), controller 12 proceeds to step S24. Display device 1 then ends the flowchart illustrated in FIG. 10.

However, when controller 12 determines that the guide route is outside the display range (YES in step S23a), controller 12 generates the display object and determines the form in which to display the display object such that the display object is shifted to be inside the display range (S23*b*). Controller 12 then proceeds to step S24. Display device 1 then ends the flowchart illustrated in FIG. 10.

Here, the shifted display object will be described with reference to FIG. 9 and FIG. 11.

Figure 11:
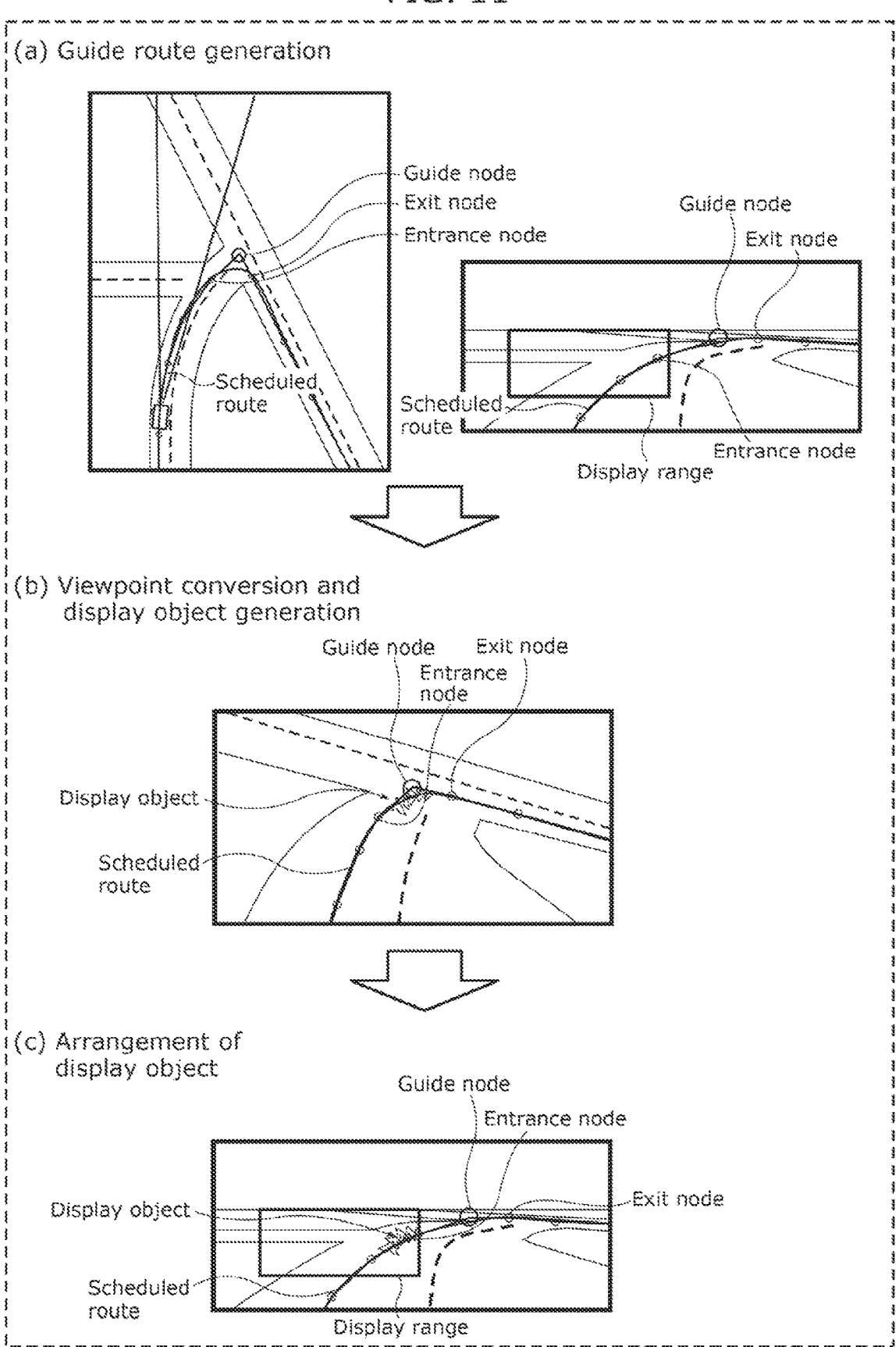
FIG. 11 illustrates another example of the series of processes from the generation of a guide route to the placement of a display object in a variation of an embodiment of the present disclosure.

FIG. 11 illustrates another example of the series of processes from the generation of the guide route to the placement of the display object in the variation of the embodiment. In (a) in FIG. 11, the left figure illustrates, from directly above, a guide route generated using a guide node, an entrance node, and an exit node, and the right figure illustrates the guide route from the viewpoint of the user. In FIG. 11, (b) illustrates the viewpoint conversion of the display object arranged along the guide route, and the generation of the display object from the overhead perspective. In FIG. 11, (c) illustrates an example in which the viewpoint-converted display object is arranged along the guide route.

As illustrated in FIG. 9, as a result of shifting the display range to the left of the guide route, the entrance node and the guide node included in the guide route fall outside the display range. In such cases, controller 12 generates the display object such that the position inside the display range closest to the entrance node that is outside the display range, the position inside the display range closest to the guide node that is outside the display range, and the exit node that is inside the display range are connected in the listed order. In this way, controller 12 generates a display object in which a portion of the guide image has been shifted to a position inside the display range approximating the guide route outside the display range.

In another example, in the scheduled route, when the guide node is located at a left or right turn, there are cases in which there is a curve before the guide node. For example, as illustrated in FIG. 11, since there is a curve before the guide node, when turning right at the guide node, the guide route falls outside the display range as a result of shifting the display range to the left of the guide route. When vehicle 2 drives through the curve, controller 12 generates the display object shifted to a position closest to outside the display range so as to approach the guide route outside the display range.

In this way, in cases in which a shifted display object is generated, controller 12 determines the form in which to display the display object such that the color and/or the luminance of at least a portion of the display object that is inside the display range.

Here, the shifted display object will be described with reference to FIG. 12A through FIG. 12C.

Figure 12A:
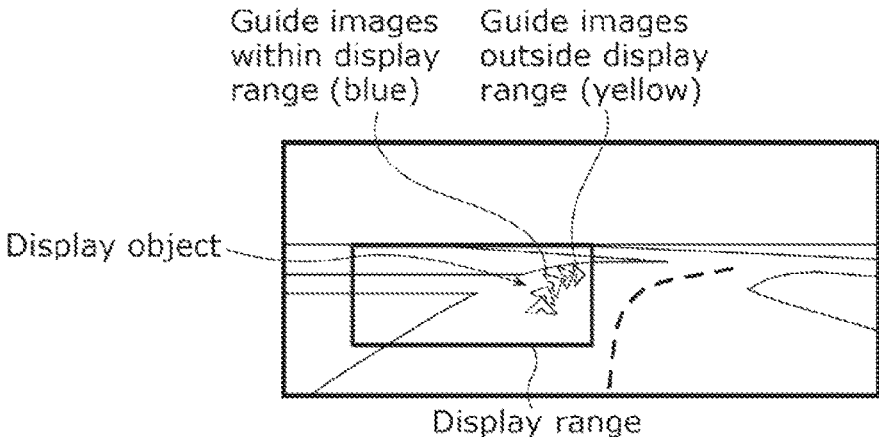
FIG. 12A illustrates a case in which the color of the portion of the guide image inside the display range and the color of the portion of the guide image outside the display range are different.

FIG. 12A illustrates a case in which the color of the portion of the guide image inside the display range and the color of the portion of the guide image outside the display range are different. FIG. 12B illustrates a case in which the luminance of the portion of the guide image inside the display range and the luminance of the portion of the guide image outside the display range are different. FIG. 12C illustrates another case in which the luminance of the portion of the guide image inside the display range and the luminance of the portion of the guide image outside the display range are different.

More specifically, when a portion of the guide image in the display object has been shifted, controller 12 determines the form in which to display the display object such that the color and/or the luminance of the shifted portion of the guide image is changed. In other words, in cases in which controller 12 shifts a guide image, controller 12 differentiates at least one of the color, design, or luminance of a non-shifted guide image and a shifted guide image.

For example, as illustrated in FIG. 12A, controller 12 may display the non-shifted guide images in blue and the shifted guide images in yellow. The guide image colors given here are merely one example; the present disclosure is not limited to the colors exemplified in the present variation.

In another example, controller 12 may display the non-shifted guide images in a solid color drawing and display the shifted guide images as a line drawing with a white fill color or display the shifted guide images as a hatched line drawing. The guide image design given here is merely one example; the present disclosure is not limited to the design exemplified in the present variation.

In another example, controller 12 may change the luminance according to whether the display object can be displayed preferentially on the road corresponding to the guide route.

Figure 12B:
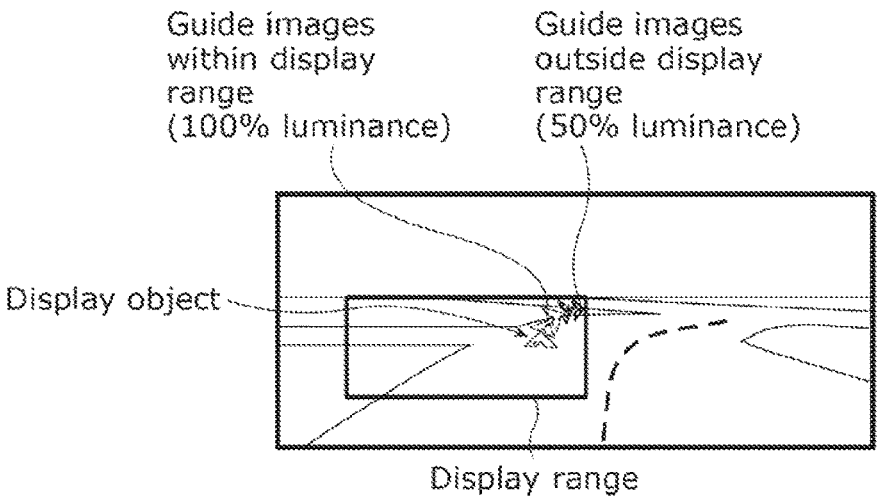
FIG. 12B illustrates a case in which the luminance of the portion of the guide image inside the display range and the luminance of the portion of the guide image outside the display range are different.

For example, as illustrated in FIG. 12B, when the display object can be displayed preferentially on the road corresponding to the guide route, controller 12 may display the non-shifted guide images at 100% luminance and display the shifted guide images at 50% luminance. The guide image luminances given here are merely one example; the present disclosure is not limited to the luminances exemplified in the present variation.

Figure 12C:
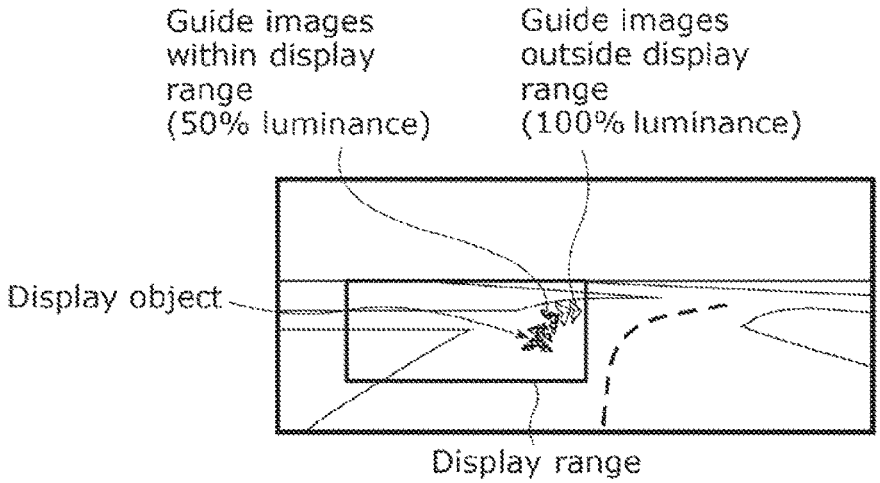
FIG. 12C illustrates another case in which the luminance of the portion of the guide image inside the display range and the luminance of the portion of the guide image outside the display range are different.

In another example, as illustrated in FIG. 12C, when the display object can be displayed preferentially on a road deviating from the guide route, controller 12 may display the non-shifted guide images at 50% luminance and display the shifted guide images at 100% luminance. The guide image luminances given here are merely one example; the present disclosure is not limited to the luminances exemplified in the present variation.

In cases in which a shifted display object is generated, controller 12 may change the display object to a form in which the color and/or luminance of all guide images in the display object has been changed.

Next, the advantageous effects of such display device 1 according to the present variation will be described.

As described above, in display device 1 according to the present variation, when at least a portion of the display object is outside of the display range, controller 12 determines the form in which to display the display object so as to shift the display object to be inside the display range.

With this, even if at least a portion of the display object is outside of the display range, each guide image that is outside of the display range can be shifted so as to be displayed inside the display range. Accordingly, even if the guide route is outside of the display range, the display object can be displayed inside the display range. Consequently, the user can correctly recognize the guide route.

In display device 1 according to the present variation, when controller 12 shifts the display object, controller 12 further changes at least one of the color or the luminance of at least a portion of the display object that is inside the display range.

This makes it possible for the user to recognize that the guide image has been shifted. Consequently, the user can correctly recognize the guide route.
(Other Variations)

Hereinbefore, the display device, the display method, and the storage medium according to the present disclosure have been described based on the above embodiments, but the present disclosure is not limited to these embodiments. Various modifications to the embodiments that may be conceived by those skilled in the art are also intended to be included within the scope of the present disclosure as long as they do not depart from the essence of the present disclosure. Moreover, variations of the above embodiments may be included in the embodiments.

For example, in display device 1, the display method, and the storage medium according to the above embodiments, the guide route is exemplified as including one guide node, one entrance node, and one exit node, but the guide route may include one or more entrance nodes and one or more exit nodes.

In display device 1, the display method, and the storage medium according to the above embodiments, a display system may be configured by combining the plurality of devices equipped in vehicle 2 and display device 1.

In the above embodiments, display device 1 is exemplified as a HUD, but the HUD may be configured as projector 14. In other words, a rendering device including inputter 11, controller 12, and renderer 13 may render the display object to be projected onto the display medium, and output the rendering result to the HUD, and thereafter, the HUD may project light that forms the display object.

Elements in the display device according to the present embodiment are typically implemented as LSI circuits, which are integrated circuits. These elements may be integrated into individual chips, or a portion or all of the elements may be integrated into one chip.

Circuit integration is not limited to LSI; the elements may be implemented using dedicated circuits or a general-purpose processor. A field programmable gate array (FPGA) which allows programming after manufacturing of the LSI circuits or a reconfigurable processor which allows reconfiguration of the connections and settings of circuit cells inside the LSI circuits may be used.

In the above embodiment, each element of the display device may be configured using dedicated hardware, or may be implemented by executing a software program suitable for the element. Each element may be implemented by a program execution unit such as a CPU or a processor reading and executing a software program recorded on a recording medium such as a hard disk or semiconductor memory.

All of the values used above are mere examples used for illustrative purposes; the embodiment of the present disclosure is not limited to the exemplary values.

Moreover, the division of the function blocks in the block diagrams are mere examples. A plurality of function blocks may be realized as a single function block, a single function block may be divided into a plurality of function blocks, or a portion of functions of one block may be transferred to a different function block. A plurality of function blocks which share similar functions can be processed by standalone hardware or software in parallel or time-shared.

The order in which the steps are executed in the flowcharts are mere examples presented for illustrative purposes; the steps may be executed in a different order. Moreover, some of the steps may be executed at the same time as (in parallel with) other steps.

Embodiments arrived at by a person skilled in the art making various modifications to any one of the above embodiments as well as embodiments realized by arbitrarily combining elements and functions in the above embodiments which do not depart from the essence of the present disclosure are included in the present disclosure.

Industrial Applicability

The present disclosure is applicable in, for example, vehicular display devices.

(Additional Statements)

Hereinafter, features of the display device and the like described based on the above embodiments will be given.

Technique 1

A display device comprising:
a controller that determines a form in which to display a display object indicating a guide image that is based on a route a vehicle is scheduled to drive on; and
a display that projects light that forms the display object in the form determined by the controller onto a display medium in the vehicle that reflects the light toward a user in the vehicle, making the display object that is displayed beyond the display medium visible to the user as a virtual image, wherein
when a condition related to driving of the vehicle is satisfied, the controller determines the form in which to display the display object so as to give the display object a shape corresponding to a view of the virtual image from an angle of depression greater than an angle of depression corresponding to a view of the virtual image from a viewpoint of the user.

Technique 2

The display device according to Technique 1, wherein
the display object includes a plurality of guide images, each of which is the guide image, displayed along the route, and
a curvature of a trajectory following an alignment of the plurality of guide images displayed on the display medium is lower than a curvature of a trajectory following an alignment of the plurality of guide images depicted in the virtual image in the view from the viewpoint of the user.

Technique 3

The display device according to Technique 1 or 2, wherein
the display object includes a plurality of guide images, each of which is the guide image, displayed along the route, and
a depression angle difference of the display object displayed on the display medium is greater than a depression angle difference of the virtual image in the view from the viewpoint of the user.

Technique 4

The display device according to Technique 2 or 3, wherein
the plurality of guide images are displayed not overlapping one another.

Technique 5

The display device according to any one of Techniques 1 to 4, wherein
the route includes a guide node, an entrance node, and an exit node, the guide node indicating a point at which the vehicle is to change course, the entrance node indicating a point before the vehicle enters the guide node, the exit node leading the vehicle through the guide node, and the controller determines the form in which to display the display object using the guide node, the entrance node, and the exit node.

Technique 6

The display device according to Technique 5, wherein the condition related to the driving of the vehicle is a condition that requires the user to operate a steering wheel of the vehicle at the guide node.

Technique 7

The display device according to Technique 6, wherein the condition that requires the user to operate the steering wheel of the vehicle includes a condition that the route includes an intersection, a condition that the route includes a curve between the vehicle and the intersection, and a condition that the route includes an additional intersection or an additional curve between the vehicle and the intersection or the curve.

Technique 8

The display device according to Technique 6 or 7, wherein the condition that requires the user to operate the steering wheel of the vehicle includes a condition that the vehicle changes course on the route.

Technique 9

The display device according to any one of Techniques 6 to 8, wherein the condition that requires the user to operate the steering wheel of the vehicle includes a condition that the route includes an intersection or a curve and the vehicle changes course immediately before the intersection or the curve.

Technique 10

The display device according to any one of Techniques 1 to 9, wherein when at least a portion of the display object is outside of a display range, the controller determines the form in which to display the display object so as to shift the display object to be inside the display range.

Technique 11

The display device according to Technique 10, wherein when the controller shifts the display object, the controller further changes at least one of a color or a luminance of at least a portion of the display object that is inside the display range.

Technique 12

The display device according to any one of Techniques 5 to 9, wherein the controller changes the display object in accordance with a portion of the route that is in a surrounding area of the guide node.

Technique 13

The display device according to any one of Techniques 2 to 4, wherein the route includes a guide node indicating a point at which the vehicle is to change course, and the controller changes at least one of the curvature of the trajectory following the alignment of the plurality of guide images, a depression angle difference of the display object, a total number of the plurality of guide images, or an angle of rotation of the plurality of guide images in accordance with a portion of the route that is in a surrounding area of the guide node.

Technique 14

The display device according to any one of Techniques 2 to 4 and 13, wherein the route includes a guide node indicating a point at which the vehicle is to change course, and the controller changes at least one of a depression angle difference of the display object, an apex angle of each of the plurality of guide images, or a size of the plurality of guide images in accordance with a distance from the vehicle to the guide node.

Technique 15

The display device according to any one of Techniques 2 to 4, 13, and 14, wherein the controller alters a speed at which to change the display object in accordance with the route.

Technique 16

The display device according to any one of Techniques 2 to 4 and 13 to 15, wherein the route includes a guide node indicating a point at which the vehicle is to change course, and the controller alters a speed at which to change the display object in accordance with a driving speed of the vehicle in a surrounding area of the guide node.

Technique 17

The display device according to any one of Techniques 2 to 4 and 13 to 16, wherein the route includes a guide node, an entrance node, and an exit node, the guide node indicating a point at which the vehicle is to change course, the entrance node indicating a point before the vehicle enters the guide node, the exit node leading the vehicle through the guide node, and when, after the controller has determined that the condition related to the driving of the vehicle has not been satisfied, the controller subsequently determines that the condition related to the driving of the vehicle has been satisfied, the controller alters a speed at which to change the display object in accordance with a curvature of the route indicating the guide node, the entrance node, and the exit node.

Technique 18

The display device according to any one of Techniques 2 to 4 and 13 to 17, wherein the route includes a guide node indicating a point at which the vehicle is to change course, and when, after the controller has determined that the condition related to the driving of the vehicle has not been satisfied, the controller subsequently determines that the condition related to the driving of the vehicle has been satisfied, the controller alters a speed at which to change the display object in accordance with a speed of the vehicle approaching the guide node.

Technique 19

A display method comprising:
determining a form in which to display a display object indicating a guide image that is based on a route a vehicle is scheduled to drive on; and
projecting light that forms the display object in the form determined in the determining onto a display medium in the vehicle that reflects the light toward a user in the vehicle, making the display object that is displayed beyond the display medium visible to the user as a virtual image, wherein
in the determining, when a condition related to driving of the vehicle is satisfied, the display object is given a shape corresponding to a view of the virtual image from an angle of depression greater than an angle of depression corresponding to a view of the virtual image from a viewpoint of the user.

Technique 20

A non-transitory computer-readable storage medium having recorded thereon a computer program for causing a computer to execute the display method according to Technique 19.
Further Information about Technical Background to this Application
The disclosures of the following patent applications including specification, drawings and claims are incorporated herein by reference in their entirety: Japanese Patent Application No. 2023-075180 filed on Apr. 28, 2023.

The invention claimed is:
1. A display device comprising:
a controller that determines a form in which to display a display object indicating a guide image that is based on a route a vehicle is scheduled to drive on; and
a display that projects light that forms the display object in the form determined by the controller onto a light-transmissive display medium in the vehicle that reflects the light toward a user in the vehicle, making the display object that is displayed beyond the display medium visible to the user as a virtual image, wherein
when a condition related to driving of the vehicle is satisfied, the controller determines the form in which to display the display object so as to give the display object a shape based on a firt view of the virtual image from a first angle of depression is greater than a second angle of depression based on a second view of the virtual image from a viewpoint of the user through the display medium.
2. The display device according to claim 1, wherein
the display object includes a plurality of guide images, each of which is the guide image, displayed along the route, and
a curvature of a trajectory following an alignment of the plurality of guide images displayed on the display medium is lower than a curvature of a trajectory following an alignment of the plurality of guide images depicted in the virtual image in the view from the viewpoint of the user.

3. The display device according to claim 2, wherein
the plurality of guide images are displayed not overlapping one another.
4. The display device according to claim 2, wherein
the route includes a guide node indicating a point at which the vehicle is to change course, and
the controller changes at least one of the curvature of the trajectory following the alignment of the plurality of guide images, a depression angle difference of the display object, a total number of the plurality of guide images, or an angle of rotation of the plurality of guide images in accordance with a portion of the route that is in a surrounding area of the guide node.
5. The display device according to claim 2, wherein
the route includes a guide node indicating a point at which the vehicle is to change course, and
the controller changes at least one of a depression angle difference of the display object, an apex angle of each of the plurality of guide images, or a size of the plurality of guide images in accordance with a distance from the vehicle to the guide node.
6. The display device according to claim 2, wherein
the controller alters a speed at which to change the display object in accordance with the route.
7. The display device according to claim 2, wherein
the route includes a guide node indicating a point at which the vehicle is to change course, and
the controller alters a speed at which to change the display object in accordance with a driving speed of the vehicle in a surrounding area of the guide node.
8. The display device according to claim 2, wherein
the route includes a guide node, an entrance node, and an exit node, the guide node indicating a point at which the vehicle is to change course, the entrance node indicating a point before the vehicle enters the guide node, the exit node leading the vehicle through the guide node, and
when, after the controller has determined that the condition related to the driving of the vehicle has not been satisfied, the controller subsequently determines that the condition related to the driving of the vehicle has been satisfied, the controller alters a speed at which to change the display object in accordance with a curvature of the route indicating the guide node, the entrance node, and the exit node.
9. The display device according to claim 2, wherein
the route includes a guide node indicating a point at which the vehicle is to change course, and
when, after the controller has determined that the condition related to the driving of the vehicle has not been satisfied, the controller subsequently determines that the condition related to the driving of the vehicle has been satisfied, the controller alters a speed at which to change the display object in accordance with a speed of the vehicle approaching the guide node.
10. The display device according to claim 1, wherein
the display object includes a plurality of guide images, each of which is the guide image, displayed along the route, and
a depression angle difference of the display object displayed on the display medium is greater than a depression angle difference of the virtual image in the view from the viewpoint of the user.
11. The display device according to claim 1, wherein
the route includes a guide node, an entrance node, and an exit node, the guide node indicating a point at which the vehicle is to change course, the entrance node indicating a point before the vehicle enters the guide node, the exit node leading the vehicle through the guide node, and the controller determines the form in which to display the display object using the guide node, the entrance node, and the exit node.

12. The display device according to claim 11, wherein the condition related to the driving of the vehicle is a condition that requires the user to operate a steering wheel of the vehicle at the guide node.

13. The display device according to claim 12, wherein the condition that requires the user to operate the steering wheel of the vehicle includes a condition that the route includes an intersection, a condition that the route includes a curve between the vehicle and the intersection, and a condition that the route includes an additional intersection or an additional curve between the vehicle and the intersection or the curve.

14. The display device according to claim 12, wherein the condition that requires the user to operate the steering wheel of the vehicle includes a condition that the vehicle changes course on the route.

15. The display device according to claim 12, wherein the condition that requires the user to operate the steering wheel of the vehicle includes a condition that the route includes an intersection or a curve and the vehicle changes course immediately before the intersection or the curve.

16. The display device according to claim 11, wherein the controller changes the display object in accordance with a portion of the route that is in a surrounding area of the guide node.

17. The display device according to claim 1, wherein when at least a portion of the display object is outside of a display range, the controller determines the form in which to display the display object so as to shift the display object to be inside the display range.

18. The display device according to claim 17, wherein when the controller shifts the display object, the controller further changes at least one of a color or a luminance of at least a portion of the display object that is inside the display range.

19. A display method comprising:

determining a form in which to display a display object indicating a guide image that is based on a route a vehicle is scheduled to drive on; and projecting light that forms the display object in the form determined in the determining onto a light-transmissive display medium in the vehicle that reflects the light toward a user in the vehicle, making the display object that is displayed beyond the display medium visible to the user as a virtual image, wherein in the determining, when a condition related to driving of the vehicle is satisfied, the display object is given a shape such that a first view of the virtual image from a first angle of depression is greater than a second angle of depression based on a second view of the virtual image from a viewpoint of the user through the display medium.

20. A non-transitory computer-readable storage medium having recorded thereon a computer program for causing a computer to execute the display method according to claim 19.

\* \* \* \* \*